US012482923B2

(12) United States Patent
Wu et al.

(10) Patent No.: US 12,482,923 B2
(45) Date of Patent: Nov. 25, 2025

(54) ANTENNA MODULE AND ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Shih-Keng Huang, Taipei (TW); Hau Yuen Tan, Taipei (TW); Chih-Wei Liao, Taipei (TW); Chia-Hung Chen, Taipei (TW); Wen-Hgin Chuang, Taipei (TW); Chia-Hong Chen, Taipei (TW); Lin-Hsu Chiang, Taipei (TW); Hsi Yung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 139 days.

(21) Appl. No.: 18/488,855

(22) Filed: Oct. 17, 2023

(65) Prior Publication Data

US 2024/0195083 A1 Jun. 13, 2024

(30) Foreign Application Priority Data

Dec. 9, 2022 (TW) ................................. 111147315

(51) Int. Cl.
*H01Q 1/24* (2006.01)
*H01Q 5/371* (2015.01)
(Continued)

(52) U.S. Cl.
CPC ............. *H01Q 1/243* (2013.01); *H01Q 5/371* (2015.01); *H01Q 9/0421* (2013.01);
(Continued)

(58) Field of Classification Search
CPC ................. H01Q 1/243; H01Q 1/2266; H01Q 5/30–371; H01Q 13/10; H01Q 21/30
See application file for complete search history.

(56) References Cited

U.S. PATENT DOCUMENTS 7,405,704 B1 * 7/2008 Lin .......................... H01Q 9/42 343/702
7,586,449 B1 * 9/2009 Chen .................... H01Q 1/2266 343/702
(Continued)

FOREIGN PATENT DOCUMENTS

CN 111697351 A * 9/2020 ........... H01Q 1/2258
CN 112928468 6/2021
(Continued)

*Primary Examiner* — Ab Salam Alkassim, Jr.
(74) *Attorney, Agent, or Firm* — J.C. PATENTS

(57) ABSTRACT

An antenna module including a first radiator and a second radiator is provided. The first radiator includes a first segment to a fifth segment connected in sequence. A first slot is formed between the second segment and the fourth segment. The second radiator has an edge. A first distance is between the second segment and an extension line. A second distance is between the fourth segment and the extension line. The first segment resonates at a first high frequency band. The first radiator and the first slot resonate at a low frequency band and a second high frequency band. The first distance, the second distance, the second segment, the fourth segment, the fifth segment and the first slot resonate at a third high frequency band. The first segment and the second radiator resonate at a fourth high frequency band. In addition, an electronic device is provided.

10 Claims, 16 Drawing Sheets

150 (100)

(51) Int. Cl.
*H01Q 9/04* (2006.01)
*H01Q 13/10* (2006.01)
*H01Q 21/30* (2006.01)
*H01Q 1/22* (2006.01)

(52) U.S. Cl.
CPC ............. *H01Q 13/10* (2013.01); *H01Q 21/30* (2013.01); *H01Q 1/2266* (2013.01)

(56) References Cited

U.S. PATENT DOCUMENTS

| | | | | |
|---|---|---|---|---|
| 8,754,817 | B1 * | 6/2014 | Kuo | H01Q 1/243<br>343/702 |
| 9,136,599 | B2 * | 9/2015 | Su | H01Q 5/357 |
| 9,450,288 | B2 * | 9/2016 | Ruan | H01Q 1/36 |
| 10,074,899 | B2 * | 9/2018 | Wu | H01Q 1/24 |
| 10,090,581 | B2 * | 10/2018 | Wu | H01Q 21/28 |
| 10,361,490 | B1 * | 7/2019 | Lee | H01Q 9/42 |
| 11,824,568 | B2 * | 11/2023 | Wei | H01Q 1/38 |
| 11,843,186 | B2 * | 12/2023 | Tan | H01Q 5/371 |
| 11,862,866 | B2 * | 1/2024 | Wu | H01Q 1/243 |
| 11,929,561 | B2 * | 3/2024 | Lee | H01Q 5/40 |
| 12,107,338 | B2 * | 10/2024 | Chang | H01Q 9/0421 |
| 12,142,849 | B2 * | 11/2024 | Wei | H01Q 5/321 |
| 12,191,557 | B2 * | 1/2025 | Wu | H01Q 7/00 |
| 2007/0200774 | A1 * | 8/2007 | Wang | H01Q 9/0421<br>343/702 |
| 2017/0162932 | A1 * | 6/2017 | Wu | H01Q 5/392 |
| 2018/0128924 | A1 * | 5/2018 | Wu | H01Q 1/38 |
| 2020/0274231 | A1 * | 8/2020 | Wei | H01Q 5/364 |
| 2021/0175631 | A1 * | 6/2021 | Wu | H01Q 13/16 |
| 2022/0328961 | A1 * | 10/2022 | Wu | H01Q 5/364 |
| 2022/0344814 | A1 * | 10/2022 | Tan | H01Q 5/371 |
| 2022/0352625 | A1 * | 11/2022 | Wu | H01Q 1/48 |
| 2022/0399907 | A1 * | 12/2022 | Wei | H01Q 1/48 |
| 2023/0155296 | A1 * | 5/2023 | Wu | H01Q 1/243<br>343/702 |
| 2023/0178887 | A1 * | 6/2023 | Chiang | H01Q 5/328<br>343/702 |
| 2023/0411845 | A1 * | 12/2023 | Chang | H01Q 9/42 |
| 2024/0014555 | A1 * | 1/2024 | Wei | H01Q 5/371 |
| 2024/0079758 | A1 * | 3/2024 | Wu | H01Q 1/48 |
| 2024/0113429 | A1 * | 4/2024 | Wu | H01Q 1/24 |
| 2024/0145898 | A1 * | 5/2024 | Wu | H01Q 1/243 |
| 2024/0162618 | A1 * | 5/2024 | Chang | H01Q 9/0442 |
| 2024/0235006 | A1 * | 7/2024 | Li | H01Q 9/0421 |
| 2025/0096476 | A1 * | 3/2025 | Wu | H01Q 21/28 |
| 2025/0149797 | A1 * | 5/2025 | Wu | H01Q 9/42 |

FOREIGN PATENT DOCUMENTS

| | | | | | |
|---|---|---|---|---|---|
| CN | 116435755 | A | * | 7/2023 | |
| CN | 117497994 | A | * | 2/2024 | |
| CN | 118472603 | A | * | 8/2024 | |
| TW | I623149 | | | 5/2018 | |
| TW | I768865 | | | 6/2022 | |
| TW | 202508140 | A | * | 2/2025 | H01Q 1/242 |

* cited by examiner

ANTENNA MODULE AND ELECTRONIC DEVICE

CROSS-REFERENCE TO RELATED APPLICATION

This application claims the priority benefit of Taiwan application serial no. 111147315, filed on Dec. 9, 2022. The entirety of the above-mentioned patent application is hereby incorporated by reference herein and made a part of this specification.

BACKGROUND

Technology Field

The disclosure relates to an antenna module and an electronic device, and particularly relates to a multi-band antenna module and an electronic device.

Description of Related Art

Generally, regarding a mobile device with an all-metal back cover, since a Wi-Fi antenna is close to a metal frame, it is easily affected by factors, such as a width of the metal frame, a way the metal frame is connected, and shielding of the all-metal back cover, resulting in poor performance of wireless transmission in low frequency band (i.e. 2.4 GHz). In order to improve the low frequency band antenna performance, a wider metal frame on the Y axis and a deeper internal space on the Z axis are required, but this is not conducive to product thinning.

SUMMARY

The disclosure is directed to an antenna module with good antenna performance in a low frequency band.

The disclosure is directed to an electronic device having the aforementioned antenna module.

The disclosure provides an antenna module including a first radiator and a second radiator. The first radiator includes a first segment, a second segment, a third segment, a fourth segment and a fifth segment connected in sequence. The first segment and the second segment are connected to a feeding terminal. The fifth segment is connected to a first ground terminal. A first slot is formed between the second segment and the fourth segment. The second radiator is disposed beside the first segment, has an edge, and is connected to a second ground terminal. The second segment is spaced apart from an extension line of the edge, and a first distance is between the second segment and the extension line. The fourth segment is spaced apart from the extension line, and a second distance is the fourth segment and the extension line. The first segment resonates at a first high frequency band. The first radiator resonates at a low frequency band and a second high frequency band. The first distance, the second distance, the second segment, the third segment, a part of the fourth segment, the fifth segment and the first slot resonate at a third high frequency band. The first segment and the second radiator resonate at a fourth high frequency band.

In an embodiment of the disclosure, the antenna module further includes a substrate, where the substrate includes a first surface and a second surface opposite each other, the first radiator and the second radiator are disposed on the first surface, the feeding terminal, the first ground terminal and the second ground terminal are disposed on the second surface, the feeding terminal is connected to the first segment and the second segment through a first through hole via, the first ground terminal is connected to the fifth segment through a second through hole via, and the second ground terminal is connected to the second radiator through a third through hole via.

In an embodiment of the disclosure, in the antenna module, a second slot is formed between the first segment and the second radiator.

In an embodiment of the disclosure, a projection of the second ground terminal on the first surface is adjacent to the edge.

In an embodiment of the disclosure, the second radiator is connected to a third ground terminal, the second ground terminal is located between the first ground terminal and the third ground terminal, and the second ground terminal is adjacent to the feeding terminal.

In an embodiment of the disclosure, the antenna module further includes a substrate and a third radiator, where the substrate includes a first surface and a second surface opposite each other, the first radiator and the second radiator are disposed on the first surface, and the third radiator is disposed on the second surface, and a projection of the third radiator on the first surface partially overlaps the second radiator, the second radiator is connected to the third radiator through a fourth through hole via, and a second slot is formed between the first segment and the projection of the third radiator on the first surface.

In an embodiment of the disclosure, the antenna module further includes a substrate, where the substrate includes a first surface and a second surface opposite each other, the second radiator has an edge, projections of the second ground terminal and the third ground terminal on the first surface are adjacent to the edge, and a part of the first radiator that is near a projection of the feeding terminal on the first surface is spaced apart from the edge, and the first distance is between the part of the first radiator and the edge.

In an embodiment of the disclosure, the third segment of the first radiator has at least one slot.

The disclosure provides an electronic device including a metal casing and the above-mentioned antenna module, the metal casing includes a frame area, the above-mentioned antenna module is disposed in the frame area, and the first ground terminal and the second ground terminal are connected to the metal casing.

In an embodiment of the disclosure, the above-mentioned metal casing includes a side wall adjacent to the antenna module, a bottom wall connected to the side wall, and a slot between the side wall and the bottom wall corresponding to the antenna module, and a length of the slot is ¼ times a wavelength of the low frequency band.

Based on the above description, the antenna module of the disclosure includes a first radiator and a second radiator. The first radiator includes a first segment, a second segment, a third segment, a fourth segment and a fifth segment connected in sequence. The first segment and the second segment are connected to a feeding terminal. The fifth segment is connected to a first ground terminal. A first slot is formed between the second segment and the fourth segment. The second radiator is disposed beside the first segment and connected to a second ground terminal. In this way, not only does the antenna module resonate at the low frequency band and the multiple high frequency bands, but also the antenna module may have a good performance on antenna efficiency in low frequency band.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
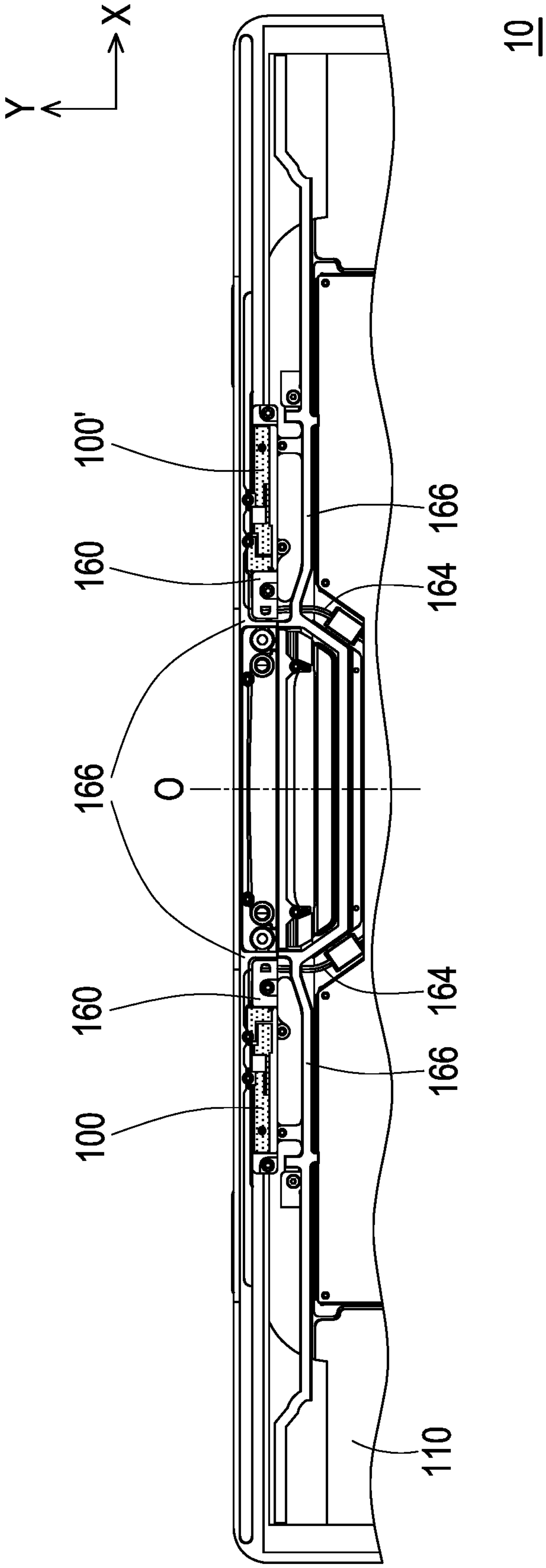
FIG. 1A is a schematic partial top view of an electronic device according to an embodiment of the disclosure.
Figure 1B:
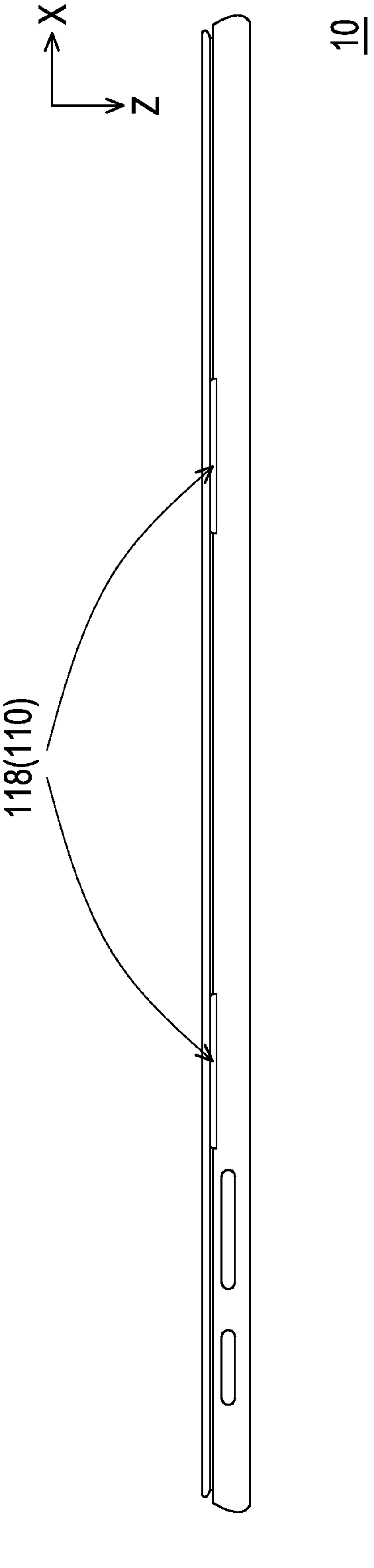
FIG. 1B is a schematic front view of FIG. 1A.

FIG. 1A is a schematic partial top view of an electronic device according to an embodiment of the present disclosure. FIG. 1B is a schematic side view of FIG. 1A. In order to clearly show the relative position of two antenna modules of the electronic device, a camera module of the electronic device is hidden in FIG. 1A.

Referring to FIG. 1A and FIG. 1B, in the embodiment, an electronic device 10 includes a metal casing 110, two antenna modules 100 and 100', two brackets 160, two coaxial transmission lines 164, and at least one metal barrier 166. In the embodiment, the electronic device 10 is, for example, a tablet computer, but the type of electronic device 10 is not limited thereto.

Figure 2:
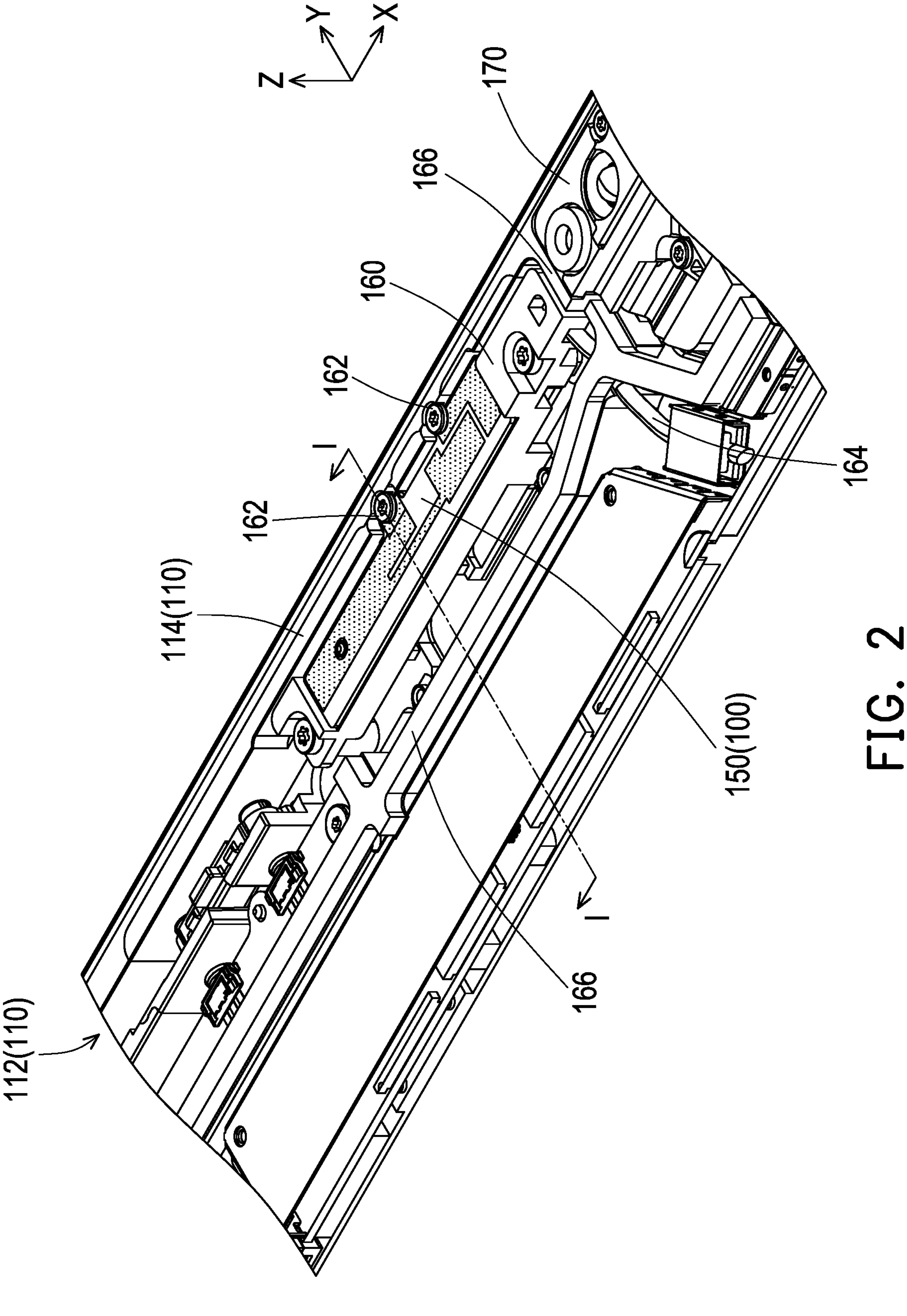
FIG. 2 is a partial three-dimensional view of FIG. 1A.

A distance between the two antenna modules 100, 100' of the embodiment is about 72 mm, which may accommodate a camera module 170 (FIG. 2). The antenna modules 100, 100' are arranged symmetrically on a short side of the electronic device 10 with respect to a central line O. Certainly, in other embodiments, the antenna module 100 may also be disposed on a long side of the electronic device 10, which may be changed according to a practical design requirement.

The embodiment uses the limited space in the electronic device 10 to accommodate the antenna modules 100, 100', and resonates at a frequency band of Wi-Fi 2.4G (2400-2500 MHZ) and a frequency band of Wi-Fi 5G/6E (5150-7125 MHz). The following description will take the antenna module 100 as an example.

Figure 3:
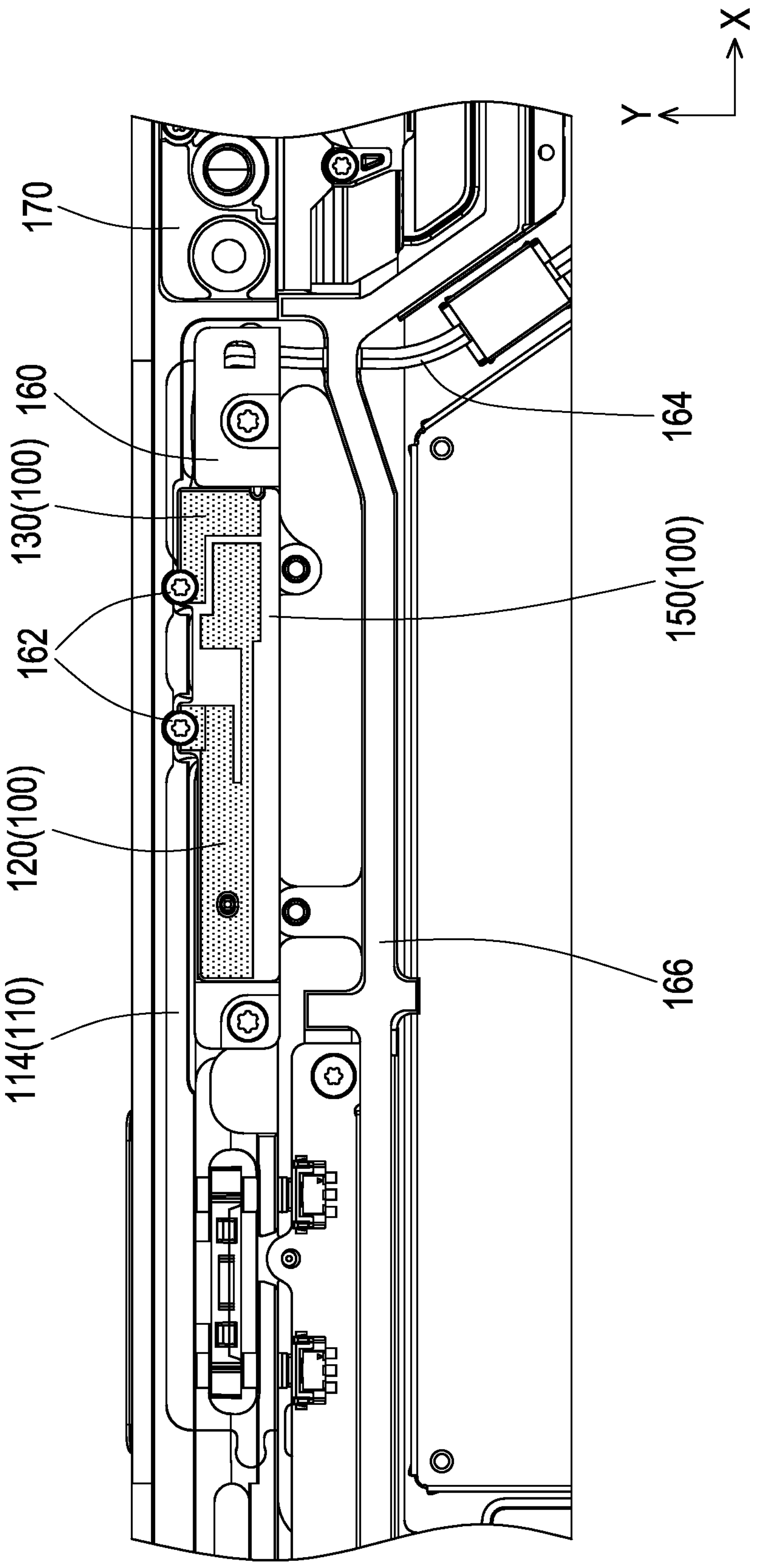
FIG. 3 is a schematic top view of FIG. 2.
Figure 4:
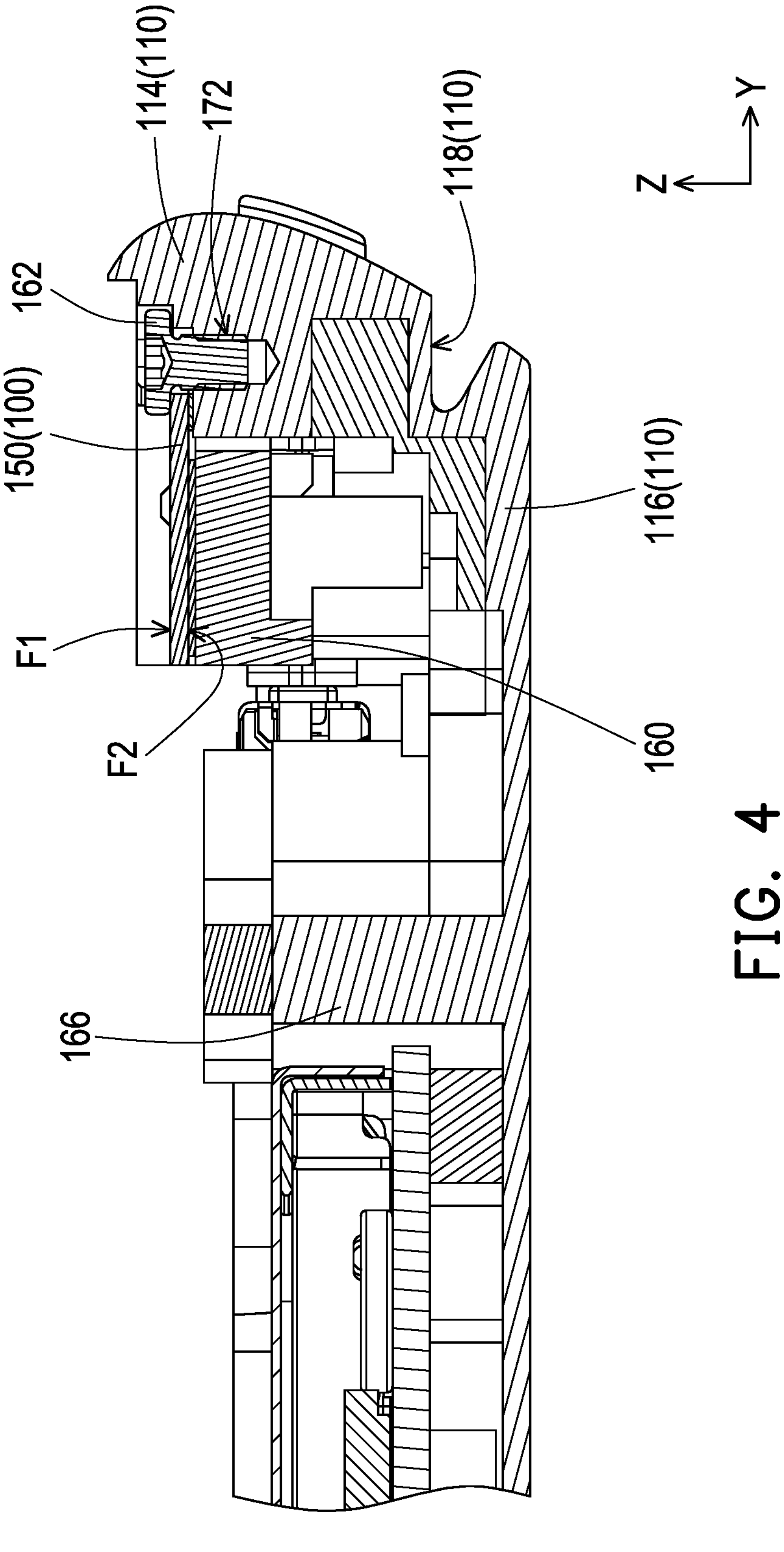
FIG. 4 is a schematic cross-sectional view along a line I-I in FIG. 2.

FIG. 2 is a partial three-dimensional view of FIG. 1A. FIG. 3 is a schematic top view of FIG. 2. FIG. 4 is a schematic cross-sectional view along a line I-I in FIG. 2. Referring to FIG. 2 to FIG. 4, the metal casing 110 includes a side wall 114 adjacent to the antenna module 100 and a bottom wall 116 connected to the side wall 114 (FIG. 4). In the embodiment, the bottom wall 116 is located on the XY plane, and the side wall 114 extends from the bottom wall 116 in the Z direction.

The antenna module 100 includes a substrate 150 (about 31 mm in length and 6 mm in width) disposed at a frame area 112 adjacent to the side wall 114. Specifically, the substrate 150 is located in a cavity (about 71.8 mm in length, 13.1 mm in width, and about 6.9 mm in height) of the frame area 112, and is attached to and fixed on the bracket 160, making full use of space of the frame area 112.

The substrate 150 has a plurality of screw holes 172 (FIG. 4), and a plurality of screwing components 162 pass through the plurality of screw holes 172 to vertically fasten the substrate 150 to the side wall 114, so that the substrate 150 is grounded to the metal casing 110 (i.e., a system ground plane) through the screwing components 162. In the embodiment, there are two screwing components 162 and two screw holes 172, but the numbers of the screwing components 162 and the screw holes 172 are not limited thereto.

In the embodiment, the coaxial transmission line 164 is connected to the substrate 150, and is used to transmit signals of the antenna module 100 to a module card (not shown) of a main board (not shown) away from the frame area 112, so as to implement further signal processing.

In the embodiment, the metal barrier 166 is disposed between the antenna module 100 and the main board, as well as between the two antenna modules 100 and 100', to form a decoupling structure to effectively block or reduce interference from a noise source of the main board on the antenna module 100, and to avoid mutual interference between the two antenna modules 100, 100' (FIG. 1A), thereby improving antenna isolation.

Figure 5A:
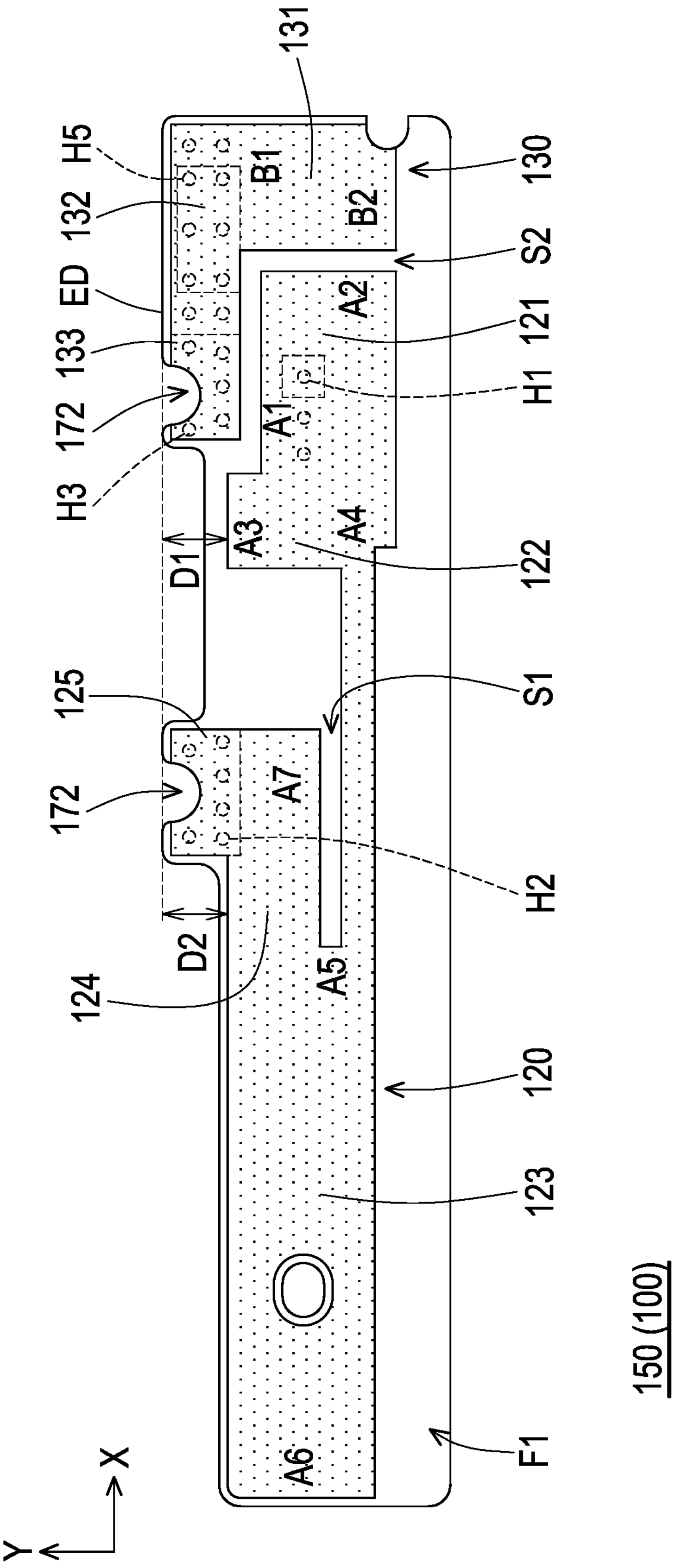
FIG. 5A is a schematic top view of the antenna module in FIG. 2.
Figure 5B:
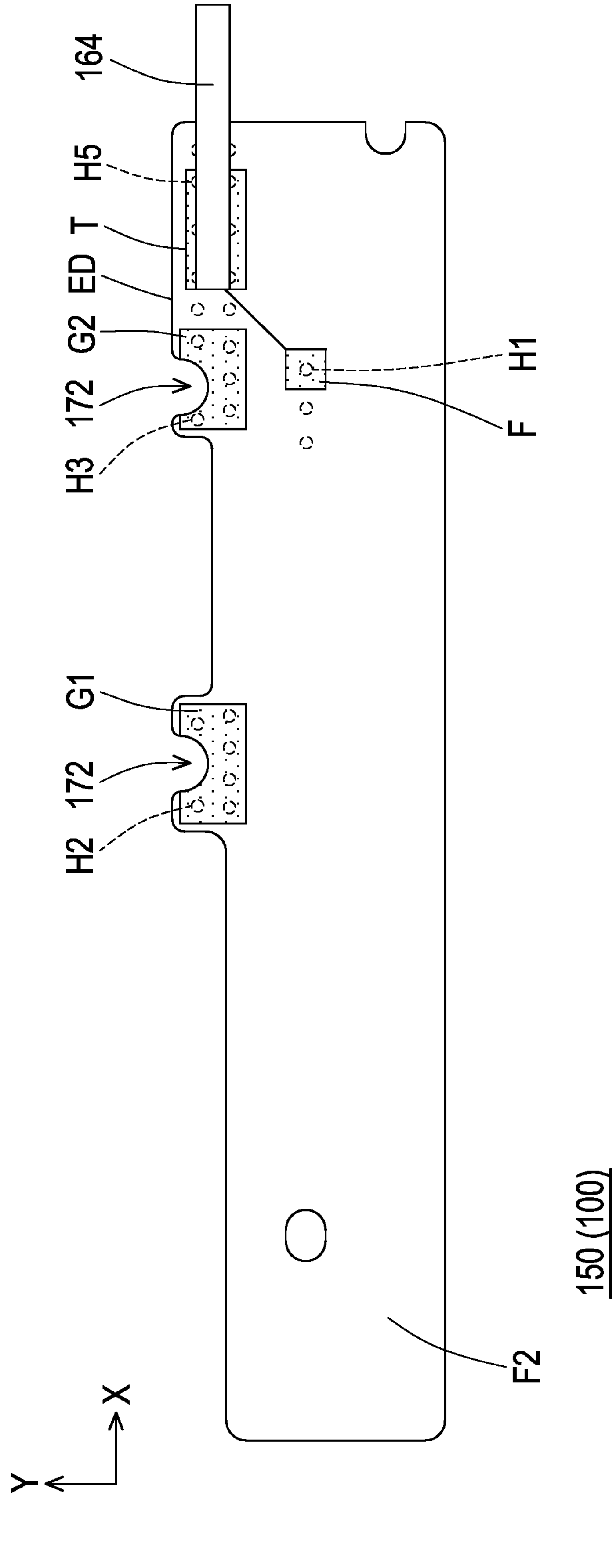
FIG. 5B is a schematic bottom view of the antenna module in FIG. 2.

FIG. 5A is a schematic top view of the antenna module in FIG. 2. FIG. 5B is a schematic bottom view of the antenna module in FIG. 2. It should be noted that in order to make a contrast with FIG. 5A, FIG. 5B shows the bottom surface of the antenna module mirrored about the Y-axis, so that FIG. 5B and FIG. 5A are in the same angle of view. Referring to FIG. 5A and FIG. 5B, in the embodiment, the substrate 150 of the antenna module 100 includes a first surface F1 (FIG. 5A) and a second surface F2 (FIG. 5B) opposite each other. The first surface F1 is a top surface of the substrate 150, and the second surface F2 is a bottom surface of the substrate 150.

The antenna module 100 further includes a first radiator 120 and a second radiator 130 adjacent to each other. The first radiator 120 and the second radiator 130 are arranged on the first surface F1 of the substrate 150.

The first radiator 120 includes a first segment 121 (a position A1 to a position A2), a second segment 122 (positions A1, A3, A4 to a position A5), a third segment 123 (the position A5 to a position A6), a fourth segment 124 (the position A5 to a position A7), and a fifth segment 125 (an area between the screw hole 172 and the position A7) connected in sequence. The first segment 121 is located on one side of the first radiator 120 (i.e., a right side of FIG. 5A), and the second segment 122, the third segment 123, the fourth segment 124 and the fifth segment 125 are located on the other side of the first radiator 120 (i.e., a left side of FIG. 5A).

The antenna module 100 further includes a feeding terminal F (FIG. 5B), a first ground terminal G1 (FIG. 5B), a second ground terminal G2 (FIG. 5B) and a ground terminal T (FIG. 5B). The feeding terminal F, the first ground terminal G1, the second ground terminal G2 and the ground terminal T are all disposed on the second surface F2 of the substrate 150. In the embodiment, the first segment 121 and the second segment 122 are connected to the feeding terminal F, and the fifth segment 125 is connected to the first ground terminal G1.

In detail, a projection of the feeding terminal F on the first surface F1 is between the first segment 121 and the second segment 122, and is connected to the first segment 121 and the second segment 122 through a first through hole via H1. The first ground terminal G1 is an ENIG (Electroless Nickel Immersion Gold) area adjacent to the screw hole 172. A projection of the first ground terminal G1 on the first surface F1 overlaps the fifth segment 125, and is connected to the fifth segment 125 through a second through hole via H2.

The second ground terminal G2 is another ENIG area adjacent to the screw hole 172, and is aligned with first ground terminal G1. A projection of the second ground terminal G2 on the first surface F1 overlaps the second radiator 130, and is connected to the second radiator 130 through a third through hole via H3.

The ground terminal T is disposed beside the second ground terminal G2, and is connected to the second radiator 130 through a fifth through hole via H5. The feeding terminal F is electrically connected to a positive signal terminal of the coaxial transmission line 164 (FIG. 5B), and the ground terminal T is electrically connected to a negative signal terminal of the coaxial transmission line 164, and the ground terminal T may be connected to the metal casing 110 (FIG. 2) through the screwing components 162 (FIG. 2) located at the first ground terminal G1 and the second ground terminal G2.

On the other hand, the second radiator 130 is disposed beside the first segment 121 and connected to the second ground terminal G2 and the ground terminal T, and includes a sixth segment 131 (a position B1 to a position B2), a seventh segment 132 (a projection of the ground terminal T on the first surface F1) and an eighth segment 133 (a projection of the second ground terminal G2 on the first surface F1) connected in sequence.

The second radiator 130 has an edge ED extending along a negative X direction. The projection of the second ground terminal G2 on the first surface F1 is adjacent to the edge ED. The second segment 122 is spaced apart from an extension line of the edge ED, and a first distance D1 is between the second segment 122 and the extension line. The fourth segment 124 is spaced apart from the extension line, and a second distance D2 is between the fourth segment 124 and the extension line.

The antenna module 100 may generate a low frequency band of WiFi 2.4G (2400-2500 MHz) and a high frequency band of WiFi 5G/6E (5150-7125 MHz) through the first radiator 120 and the second radiator 130. In detail, a signal fed from the feeding terminal F may resonate at a first high frequency band (5200 MHz) through a path of the first segment 121, and by changing a length and a width of the first segment 121, a central frequency and impedance matching of the first high frequency band may be adjusted.

The first radiator 120 resonates at a low frequency band and a second high frequency band. Specifically, the signal is fed from the feeding terminal F and travels along the first segment 121, the second segment 122, the third segment 123, the fourth segment 124 and the fifth segment 125, which forms a PIFA (planar inverted-F antenna) structure and further resonates at the low frequency band (2400-2500 MHZ) of Wi-Fi 2.4G and the second high frequency band (5900 MHZ). By changing the second distance D2 and a width of the fifth segment 125, central frequencies and impedance matching of the low frequency band and the second high frequency band may be further adjusted.

The signal is fed from the feeding terminal F and travels along the second segment 122, the fourth segment 124 to the fifth segment 125 and couples the first distance D1, the second distance D2 and a first slot S1, to resonate at a third high frequency band (6400 MHZ). It should be noted that the first slot S1 is formed between the second segment 122 and the fourth segment 124. By changing a width of the first slot S1 and the first distance D1, a central frequency and impedance matching of the third high frequency band may be further adjusted.

The first segment 121 and the second radiator 130 resonate at a fourth high frequency band. In detail, the first segment 121 and the path formed by the sixth segment 131, the seventh segment 132 and the eighth segment 133 form an open-loop antenna structure, which resonates at the fourth high frequency band (7000 MHZ). It should be noted that the antenna module 100 has a second slot S2 formed between the first segment 121 and the second radiator 130. By changing a width of the second slot S2, a central frequency and impedance matching of the fourth high frequency band may be adjusted.

Referring back to FIG. 1B and FIG. 4, in the embodiment, the metal casing 110 has two slots 118 (about 29.8 mm in length, 1.19 mm in width, and 0.87 mm in height) formed between the side wall 114 (FIG. 4) and the bottom wall 116 (FIG. 4), and the positions of the slots correspond to the antenna module 100 (FIG. 4). A length of the slot 118 is ¼ times a wavelength of the aforementioned low frequency band, which may effectively improve antenna efficiency of Wi-Fi 2.4G and improve impedance matching of Wi-Fi 6E (5925-7125 MHz). The slot 118 is filled with plastic to maintain appearance integrity. Certainly, the metal casing 110 may not have slots, which may be determined according to practical design requirements.

Figure 6:
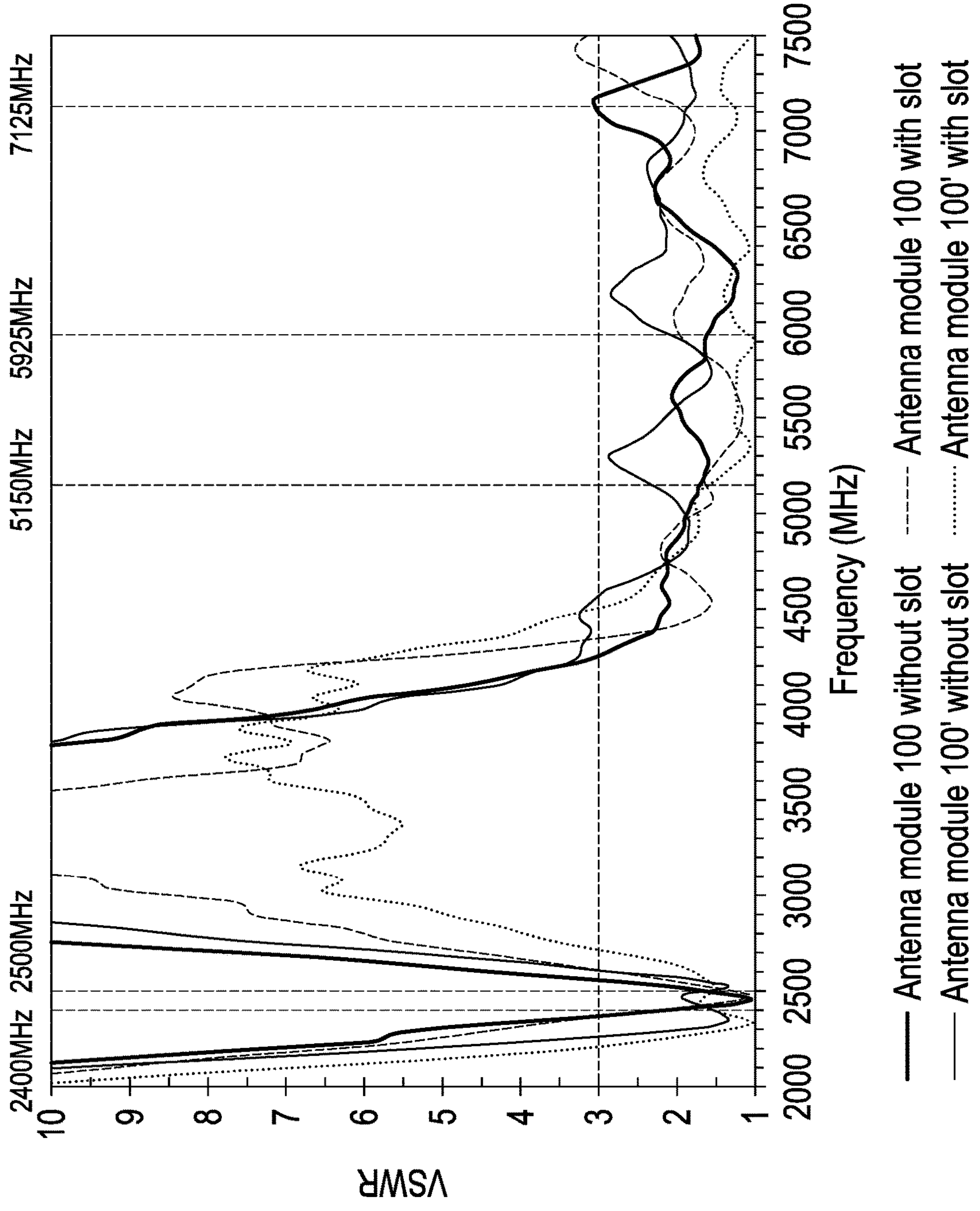
FIG. 6 is a relationship diagram of frequency-voltage standing wave ratio (VSWR) of the antenna module of the electronic device of FIG. 1A.

FIG. 6 is a relationship diagram of frequency-voltage standing wave ratio (VSWR) of the antenna module of the electronic device of FIG. 1A. Referring to FIG. 6, in the embodiment, whether the metal casing 110 (FIG. 4) has the slot 118 (FIG. 4), VSWRs (voltage standing wave ratios) of the antenna modules 100, 100' (FIG. 1A) are all below 3 in the high frequency band section, and the antenna modules 100, 100' have good antenna performance.

Figure 7:
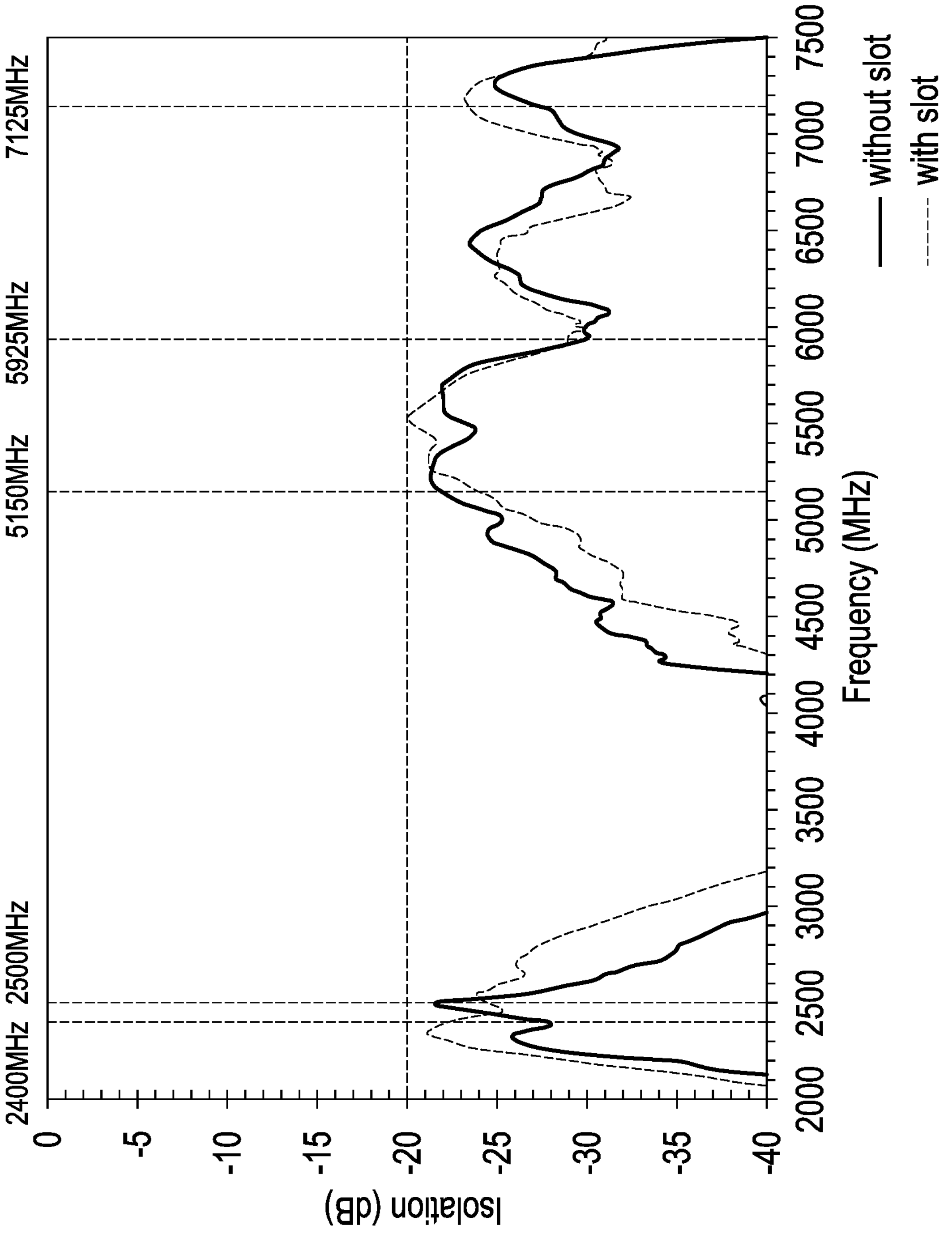
FIG. 7 is a relationship diagram of frequency-isolation between the two antenna modules of the electronic device of FIG. 1A.

FIG. 7 is a relationship diagram of frequency-isolation between two antenna modules of the electronic device of FIG. 1A. Referring to FIG. 7, in the embodiment, whether the metal casing 110 (FIG. 4) has the slot 118 (FIG. 4), the isolation of the antenna modules 100, 100' (FIG. 1A) may be below −20 dB, which has good isolation performance.

Figure 8:
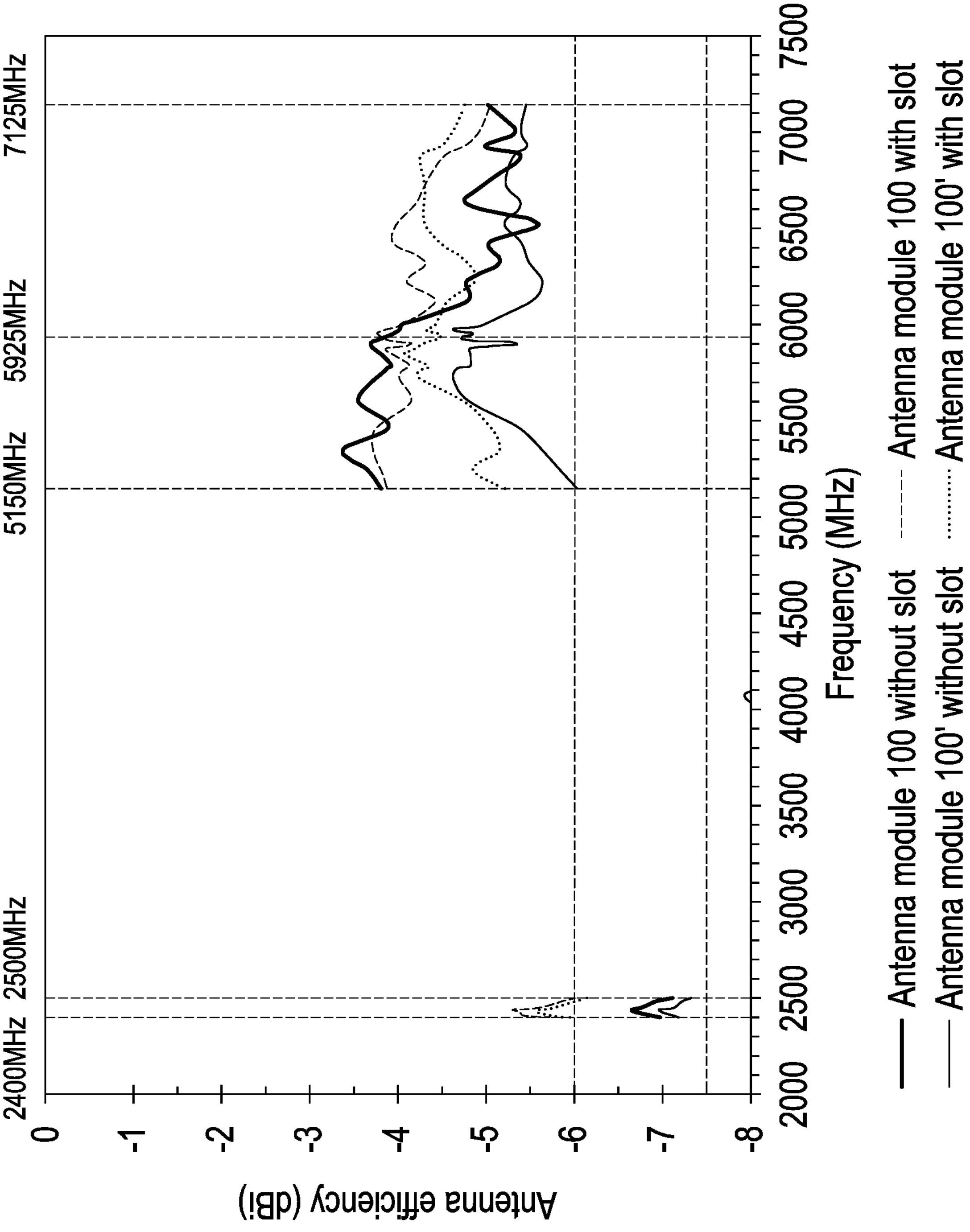
FIG. 8 is a relationship diagram of frequency-antenna efficiency of the electronic device of FIG. 1A.

FIG. 8 is a relationship diagram of frequency-antenna efficiency of the electronic device of FIG. 1A. Referring to FIG. 8, when the metal casing 110 (FIG. 4) adopts a design without the slot 118 (FIG. 4), the antenna efficiency of Wi-Fi 2.4G of the antenna modules 100, 100' (FIG. 1A) in low frequency band is from −6.5 to −7.5 dBi while its antenna efficiency of WiFi 5G/6E in high frequency band is from −3.5 to −6 dBi. When the metal casing 110 adopts the design with the slot 118, the antenna efficiency of Wi-Fi 2.4G of the antenna modules 100 and 100' in low frequency band may be increased by at least 1.5-2 dBi, and the antenna efficiency of WiFi 5G/6E in high frequency band may be increased by at least 0.5-1.0 dBi, which has good antenna efficiency performance.

Figure 9A:
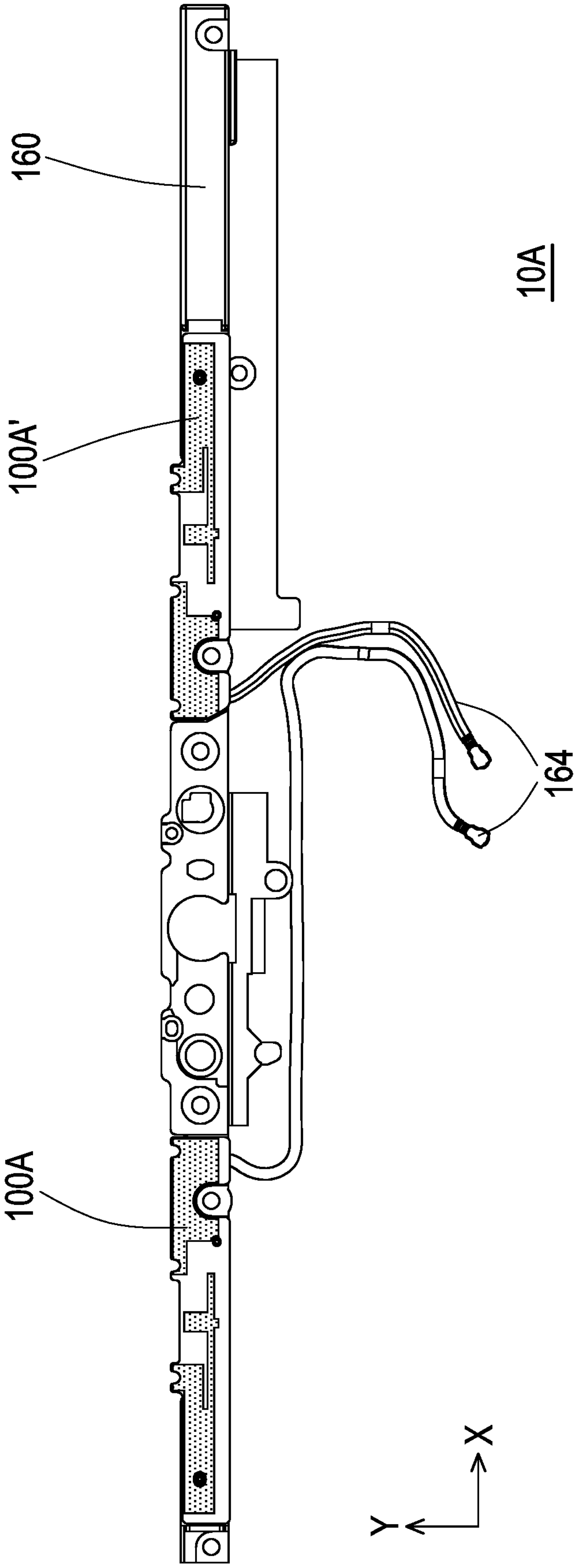
FIG. 9A is a schematic top view of an electronic device according to another embodiment of the disclosure.
Figure 9B:
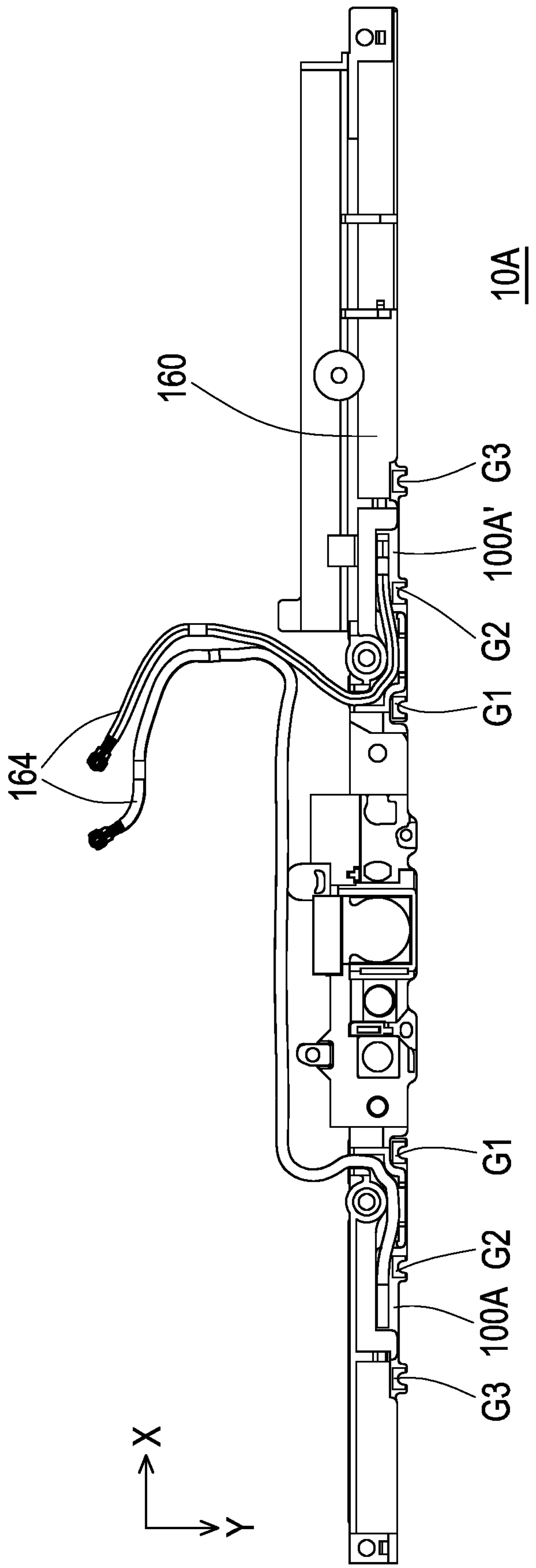
FIG. 9B is a schematic bottom view of FIG. 9A.

FIG. 9A is a schematic top view of an electronic device according to another embodiment of the disclosure. FIG. 9B is a schematic bottom view of FIG. 9A. In order to clearly show the antenna module, the electronic device 10 in FIG. 9A and FIG. 9B only shows the antenna module, the bracket and the coaxial transmission line.

Referring to FIG. 9A and FIG. 9B, the coaxial transmission line 164 may be fixed on the bracket 160 through a cable management groove structure of the bracket 160. The main difference between the electronic device 10A of FIG. 9A and FIG. 9B and the electronic device 10 of FIG. 1A is that the antenna modules 100A and 100A' have a third radiator 140A (FIG. 10B) and a third ground terminal G3 (FIG. 9B) each, the antenna module 100A is taken as an example for description below.

Figure 10A:
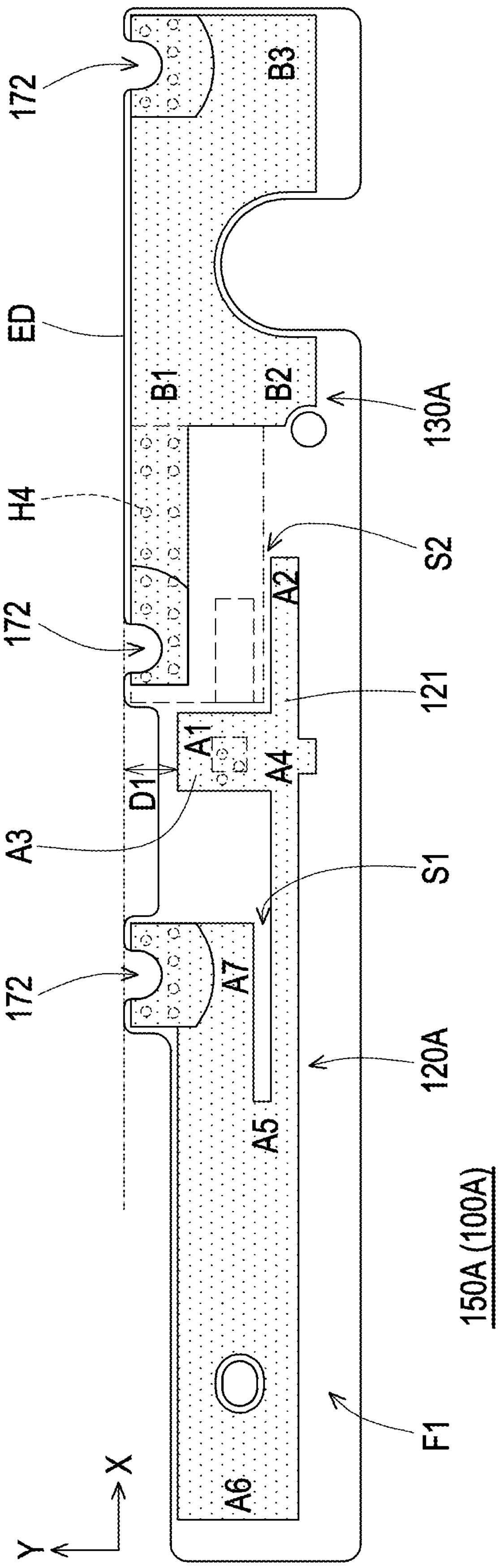
FIG. 10A is a schematic top view of the antenna module shown in FIG. 9A.
Figure 10B:
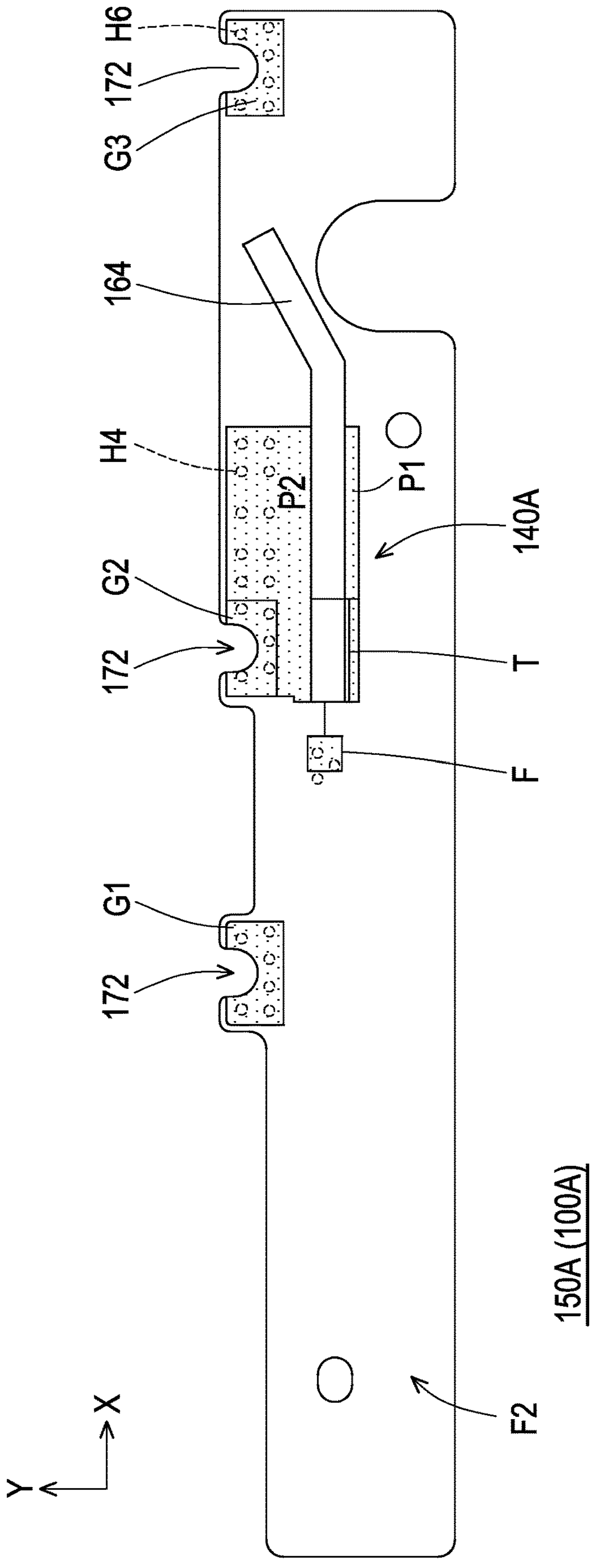
FIG. 10B is a schematic bottom view of the antenna module shown in FIG. 9A.

FIG. 10A is a schematic top view of the antenna module shown in FIG. 9A. FIG. 10B is a schematic bottom view of the antenna module shown in FIG. 9A. It should be noted that in order to make a contrast with FIG. 10A, FIG. 10B shows the bottom surface of the antenna module mirrored about the Y-axis, so that FIG. 10B and FIG. 10A have the same angle of view. Referring to FIG. 10A and FIG. 10B, in the embodiment, the third radiator 140A (shown in FIG. 10B) is disposed on the second surface F2 (FIG. 10B) of the substrate 150A. The projection of the third radiator 140A on the first surface F1 partially overlaps the second radiator 130A, and the second radiator 130A is connected to the third radiator 140A through a fourth through hole via H4.

In other words, the embodiment makes full use of the space on the second surface F2 of the substrate 150A to arrange the third radiator 140A, and integrates the ground terminal T (FIG. 10B) and the second ground terminal G2 (FIG. 10B) into one piece (i.e., the second ground terminal G2, the ground terminal T, the position P1 and the position P2). Meanwhile, the second slot S2 is formed between the first segment 121 of the first radiator 120A and the projection of the third radiator 140A on the first surface F1. The antenna bandwidth (5925-7125 MHZ) may be increased by adjusting the antenna patterns on the first surface F1 and the second surface F2, and the second slot S2.

On the other hand, there are three screw holes 172 in the embodiment, which are located in the first ground terminal G1 (FIG. 10B), the second ground terminal G2 and the third ground terminal G3 (FIG. 10B). The first ground terminal G1, the second ground terminal G2 and the third ground terminal G3 are all disposed on the second surface F2. The second ground terminal G2 is located between the first ground terminal G1 and the third ground terminal G3, and the second ground terminal G2 is adjacent to the feeding terminal F.

The second radiator 130A is connected to the third ground terminal G3 through a sixth through hole via H6, and the second radiator 130A forms a path (the position B1, the position B2, a position B3 and the third ground terminal G3). Through the design of the above path and the three screw holes 172, not only are a grounding area of the antenna and the antenna bandwidth (5150-7125 MHZ) increased, but also the interference generated by the coaxial transmission line 164 (FIG. 10B) across the bottom of the antenna pattern is reduced in high frequency bands.

In addition, similar to the embodiment of FIG. 5A, the second radiator 130A of the embodiment has an edge ED extending in the X direction. Projections of the second ground terminal G2 and the third ground terminal G3 on the first surface F1 are adjacent to the edge ED. The part of the first radiator 120 that is near a projection of the feeding terminal F on the first surface F1 is spaced apart from the edge ED, and a first distance D1 is between the part of the first radiator 120 and the edge ED. By changing a width of the first slot S1 and the first distance D1, a central frequency and impedance matching of the third high frequency band may be effectively adjusted.

Figure 11A:
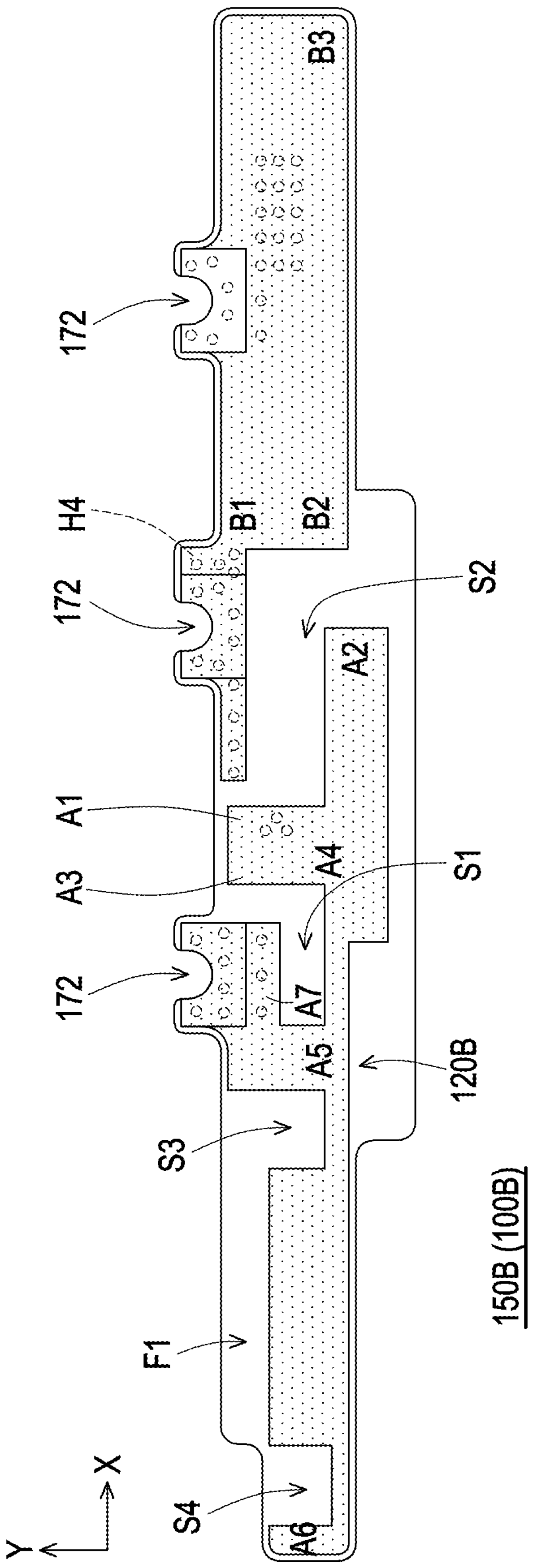
FIG. 11A is a schematic top view of an antenna module of an electronic device according to another embodiment of the disclosure.
Figure 11B:
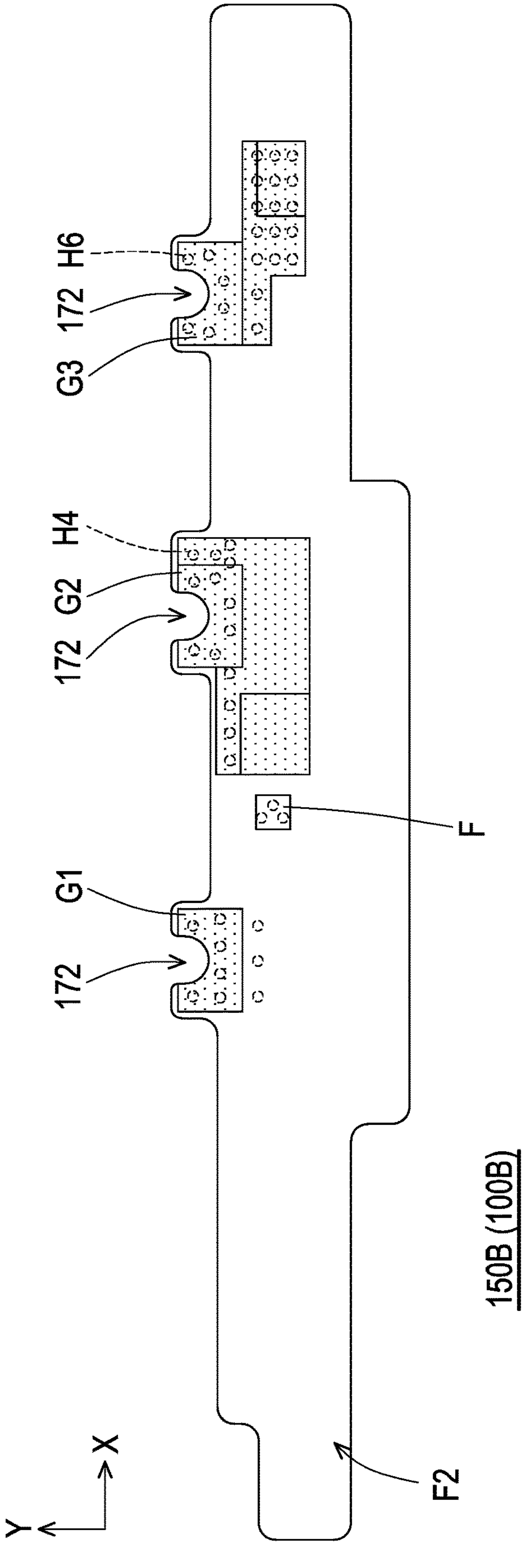
FIG. 11B is a schematic bottom view of the antenna module of the electronic device shown in FIG. 11A.

FIG. 11A is a schematic top view of an antenna module of an electronic device according to another embodiment of the disclosure. FIG. 11B is a schematic bottom view of the antenna module of the electronic device shown in FIG. 11A. It should be noted that in order to make a contrast with FIG. 11A, FIG. 11B shows the bottom surface of the antenna module mirrored about the Y-axis, so that FIG. 11B and FIG. 11A have the same angle of view. Referring to FIG. 11A and FIG. 11B, the main difference between the antenna module 100B of FIG. 11A and FIG. 11B and the antenna module 100A of FIG. 10A lies in a design change of a first radiator 120B.

Specifically, the widths of the first radiator 120B at the positions A4 and A2 may be increased, so as to improve the impedance matching of the third high frequency band and the fourth high frequency band. On the other hand, the widths of the first radiator 120B at the positions A6, A5 and A7 may be adjusted, for example, a third slot S3 and a fourth slot S4 are formed in the third segment (i.e., between the position A5 and the position A6). The position of resonance frequency in the low frequency band is adjusted by changing the thickness of the resonance path, so that the position of the resonance frequency is not fixed at a specific position.

In summary, based on the above descriptions, the antenna module of the disclosure includes a first radiator and a second radiator. The first radiator includes a first segment, a second segment, a third segment, a fourth segment and a fifth segment connected in sequence. The first segment and the second segment are connected to a feeding terminal. The fifth segment is connected to a first ground terminal. A first slot is formed between the second segment and the fourth segment. The second radiator is disposed beside the first segment, and has an edge and connected to a second ground terminal. A first distance is between the second segment and the extension line of the edge. A second distance is between the fourth segment and the extension line. In this way, not only may the limited space be used to resonate at low frequency band and multiple high frequency bands, but also the antenna module may have good performance on antenna efficiency in low frequency band and high frequency band.

What is claimed is:

1. An antenna module, comprising:
a feeding terminal;
a first ground terminal;
a second ground terminal;
a first radiator, comprising a first segment, a second segment, a third segment, a fourth segment and a fifth segment connected in sequence, wherein the first segment and the second segment are connected to the feeding terminal, the fifth segment is connected to the first ground terminal, and a first slot is formed between the second segment and the fourth segment; and
a second radiator, disposed beside the first segment, having an edge and connected to the second ground terminal, wherein
the second segment is spaced apart from an extension line of the edge, a first distance is between the second segment and the extension line, the fourth segment is spaced apart from the extension line, a second distance is between the fourth segment and the extension line, the first segment resonates at a first high frequency band, the first radiator resonates at a low frequency band and a second high frequency band, the first distance, the second distance, the second segment, the fourth segment, the fifth segment and the first slot resonate at a third high frequency band, and the first segment and the second radiator resonate at a fourth high frequency band.

2. The antenna module as claimed in claim 1, further comprising a substrate, wherein the substrate comprises a first surface and a second surface opposite each other, the first radiator and the second radiator are disposed on the first surface, the feeding terminal, the first ground terminal and the second ground terminal are disposed on the second surface, the feeding terminal is connected to the first segment and the second segment through a first through hole via, the first ground terminal is connected to the fifth segment through a second through hole via, and the second ground terminal is connected to the second radiator through a third through hole via.

3. The antenna module as claimed in claim 1, wherein a second slot is formed between the first segment and the second radiator.

4. The antenna module as claimed in claim 2, wherein a projection of the second ground terminal on the first surface is adjacent to the edge.

5. The antenna module as claimed in claim 1, wherein the second radiator is connected to a third ground terminal, the second ground terminal is located between the first ground terminal and the third ground terminal, and the second ground terminal is adjacent to the feeding terminal.

6. The antenna module as claimed in claim 1, further comprising a substrate and a third radiator, wherein the substrate comprises a first surface and a second surface opposite each other, the first radiator and the second radiator are disposed on the first surface, the third radiator is disposed on the second surface, a projection of the third radiator on the first surface partially overlaps the second radiator, the second radiator is connected to the third radiator through a fourth through hole via, and a second slot is formed between the first segment and the projection of the third radiator on the first surface.

7. The antenna module as claimed in claim 5, further comprising a substrate, wherein the substrate comprises a first surface and a second surface opposite each other, projections of the second ground terminal and the third ground terminal on the first surface are adjacent to the edge, a part of the first radiator that is near a projection of the feeding terminal on the first surface is spaced apart from the edge, and the first distance is between the part of the first radiator and the edge.

8. The antenna module as claimed in claim 1, wherein the third segment of the first radiator has at least one slot.

9. An electronic device, comprising:

a metal casing, comprising a frame area; and an antenna module, disposed in the frame area and comprising:

a feeding terminal;

a first ground terminal;

a second ground terminal;

a first radiator, comprising a first segment, a second segment, a third segment, a fourth segment and a fifth segment connected in sequence, wherein the first segment and the second segment are connected to the feeding terminal, the fifth segment is connected to the first ground terminal, and a first slot is formed between the second segment and the fourth segment; and a second radiator, disposed beside the first segment, having an edge and connected to the second ground terminal, wherein the second segment is spaced apart from an extension line of the edge, a first distance is between the second segment and the extension line, the fourth segment is spaced apart from the extension line, a second distance is between the fourth segment and the extension line, the first segment resonates at a first high frequency band, the first radiator resonates at a low frequency band and a second high frequency band, the first distance, the second distance, the second segment, the fourth segment, the fifth segment and the first slot resonate at a third high frequency band, the first segment and the second radiator resonate at a fourth high frequency band, and the first ground terminal and the second ground terminal are connected to the metal casing.

10. The electronic device as claimed in claim 9, wherein the metal casing comprises a side wall adjacent to the antenna module, a bottom wall connected to the side wall, and a slot between the side wall and the bottom wall and corresponding to the antenna module, and a length of the slot is $\frac{1}{4}$ times a wavelength of the low frequency band.

* * * * *